July 12, 1960 R. COBURN ET AL 2,944,346
THREE-COORDINATE RADAR SIMULATOR
Filed June 6, 1955 4 Sheets-Sheet 1

INVENTOR.
RICHARD COBURN
JAMES M. HEDLUN
BY
ATTORNEYS

INVENTOR.
RICHARD COBURN
BY JAMES M. HEDLUN

ATTORNEYS

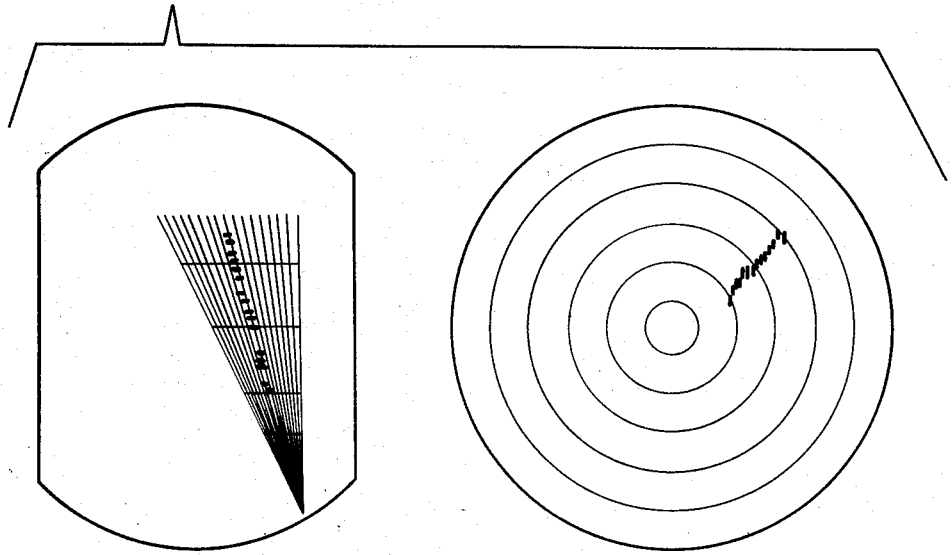

United States Patent Office 2,944,346
Patented July 12, 1960

2,944,346

THREE-COORDINATE RADAR SIMULATOR

Richard Coburn, 2018 Catalina Blvd., and James M. Hedlun, 4719 Chickasaw Court, both of San Diego, Calif.

Filed June 6, 1955, Ser. No. 513,618

11 Claims. (Cl. 35—10.4)

(Granted under Title 35, U.S. Code (1952), sec. 266)

The invention described herein may be manufactured and used by or for the Government of the United States of America for governmental purposes without the payment of any royalties thereon or therefor.

This invention relates to three-coordinate radar target simulators and in particular to a target simulator which will duplicate the sweep and scan timing relationships which exist in search and height-scanning radar indicators. This type of simulator combines the flying spot principle with a novel method of simulating radar system timing relationships so as to generate targets in elevation as well as plan view.

The simulator of this invention is used in conducting controlled studies of signal detectability and tracking performance for which repeatable programs of multiple targets in three-coordinates are required. It may be used as a trainer in applications requiring a qualitative level of realism and programmed target tracks, for example, as a demonstrator to familiarize observers with the general characteristics of radar displays. It provides the repeatable program necessary for the comparative study of two or more different types of display of the same video information for evaluation thereof. It may also be used as a procedural trainer for the radar operator and information-handling team. This simulator generates video outputs for up to thirty-six radar targets moving in three dimensions, feeds standard P.P.I. and R.H.I. type radar indicators and provides repeatable programs of target movement of varying lengths. With minor modifications the simulator may also generate land mass video, provide a noise background, and accommodate controllable targets.

Various methods have been utilized to generate synthetic radar targets but most of these generate only two-coordinate targets suitable for plan position display. Existing three-coordinate problem generators are of a complex nature, employing analog computer techniques and control units to obtain tracks. These lack the stability for the exact and reliable programming required in experimental work. Cost, complexity of construction and maintenance requirements are further disadvantages.

The simulator comprising this invention synthetically generates targets by duplicating the timing relationships used in actual radar systems by use of the flying spot scanner technique and a moving punched paper tape. It requires no computer or control unit to generate a track. Variations in problems are accomplished by changing tapes, by selective gating or by shifting of the flying spot traces. The simulator comprises a P.P.I. target generator, consisting of a cathode ray tube with associated deflection amplifiers, a paper transport mechanism and synchro generator driven by a synchronous motor, a photomultiplier, pulse amplifier and differentiator, trigger generator, and sector gate programmer, and a height target generator, consisting of two C.R.T.'s with associated deflection amplifiers, two paper transport mechanisms, a synchro generator, and two synchronous motors all mechanically linked together, two photomultipliers, two pulse amplifiers with differentiation and one coincidence gate, a trigger generator and a sector gate programmer.

It is, therefore, an object of this invention to provide an improved three-coordinate radar target simulator.

A further object is the provision of a radar simulator for synthetically generating targets by duplicating the timing relationships in actual radar systems, using the flying spot scanner technique and moving punched paper tape.

Still a further object is the provision of a target simulator easily adaptable to a variety of presentation problems and which may be continuously repeated with a high degree of reliability.

A further object is the provision of a radar target simulator of low cost, simple construction, requiring minimum maintenance, yet is capable of presenting a multiple of targets of realistic quality in both plan and height presentation.

Other objects and many of the attendant advantages of this invention will be readily appreciated as the same becomes better understood by reference to the following detailed description when considered in connection with the accompanying drawings wherein:

Fig. 7 is a time exposure of P.P.I. and R.H.I. presentation of a single synthetic target track; and Fig. 8 is a time exposure of a P.P.I. presentation of a multiple of synthetic target tracks.

To facilitate easier understanding of the present invention, comparison is made with a conventional radar system involving search and height-scanning.

*Search radar timing*

Figure 1:
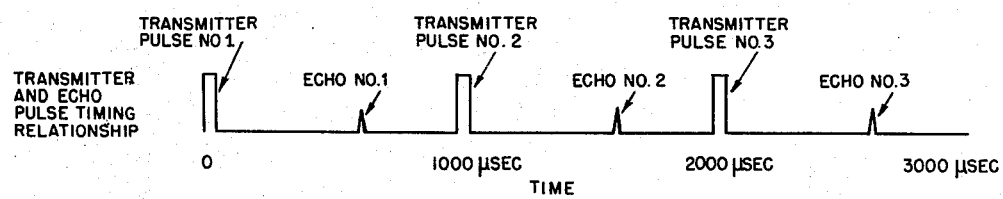
Fig. 1 shows the transmitter and echo pulse timing relationships.

In a search radar, the transmitter simultaneously triggers the indicator sweep and emits very short pulses which are widely but uniformly separated. Typical time values are a pulse duration of 2 microseconds and a repetition period of 1000 microseconds. When the directional antenna is trained at a target, the transmitted pulses are reflected back to the antenna and appear as echoes of approximately the same pulse duration but delayed in time. The relationship between the transmitter pulse and echo pulse is shown in Fig. 1.

Figure 2:
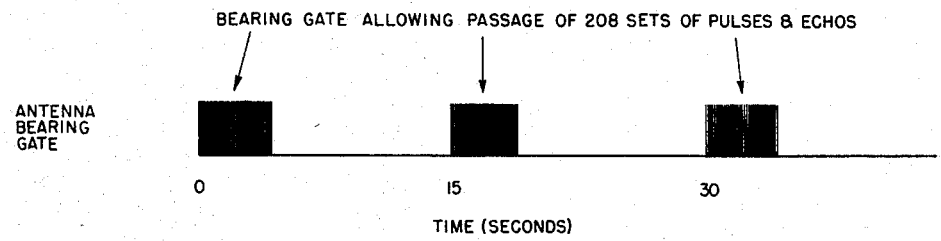
Fig. 2 shows bearing gate timing for passage of pulses and sets.

In order to search in all directions the antenna is made to rotate at a speed between 3 and 8 r.p.m. Assuming a rate of 4 r.p.m. and a beam width of 5°, the antenna will be on target for $$15 \text{ seconds} \times \frac{5}{360}$$

or approximately 0.208 second. During this time 208,000 microseconds) there would be $$\frac{208000}{1000}$$

or 208 transmitted pulses which could hit the target and return. Thus, in effect, a bearing gate exists which is open for 0.208 second, allowing pulses to enter the receiver. These relationships are shown in Fig. 2.

Figure 4:
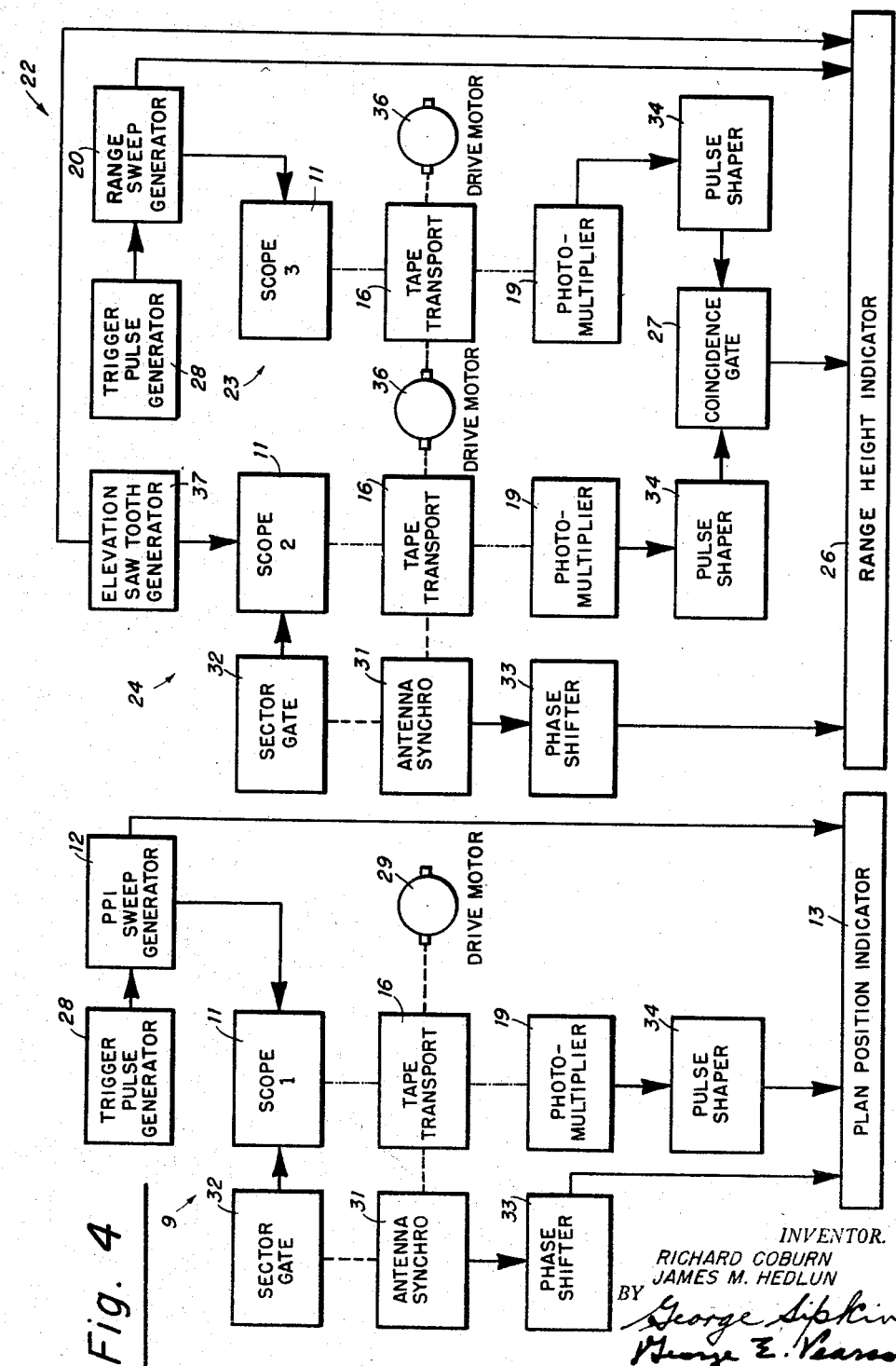
Fig. 4 is a block diagram of the simulator.

These same relationships occur in the P.P.I. target generator 9 by generating range or echo pulses and bearing gates as follows:

(1) *Echo pulses.*—An A-trace 10 on the target generator's oscilloscope 11 is triggered by sweep generator 12 at the pulse repetition rate simultaneously with the P.P.I. sweep of display indicator 13, scope 1 and indicator 13, for this purpose, being connected electrically to generator 12, as shown in Fig. 4. The A-trace duration is set for the maximum range desired. Targets are encoded as holes punched in an opaque tape 14 which is caused to pass in front of the scope by means of tape transport 16. The ratio of hole-width 17 to tape-width 18 is made roughly equal to the ratio of transmitter pulse duration to pulse repetition period as illustrated in Fig. 1. Thus, as the A-trace sweeps the tape, pulses of light of approximately the correct echo duration are generated and then converted to video in a photomultiplier 19 and amplifier circuit. The time difference between the start of the sweep and the appearance of the echo represents range.

(2) *Bearing gate.*—The length 21 of the holes is equivalent to the horizontal beamwidth of the search antenna. The tape advance corresponds to antenna rotation. Thus the length of the holes determines the bearing gate size which, otherwise expressed, represents the on target time and the positions of the holes along the tape represent bearing. The bearing gate for each target presentation allows an appropriate number of the light pulses to pass to the photomultiplier as illustrated in Fig. 2.

*Height radar timing*

Figure 3:
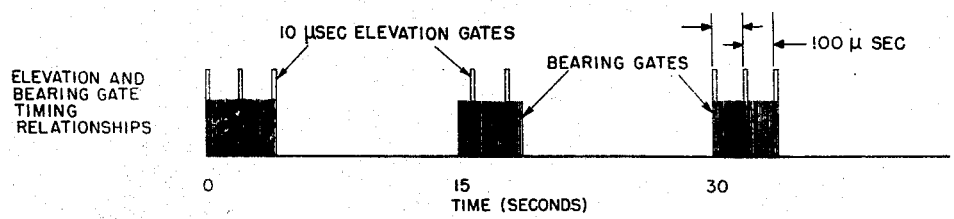
Fig. 3 shows elevation and bearing gate timing relationships.

Timing relationships in a height-scanning radar are somewhat more complex than those just described for the search radar. Not only does the height radar antenna rotate in azimuth, but it also scans in elevation. An echo may be received only when the antenna is on target in both azimuth and elevation scan. (The on-target times will be referred to below as bearing and elevation gates, respectively.) The elevation scanning rate is typically about 10 c.p.s. over approximately 10 degrees elevation. Therefore, assuming a 4-r.p.m. rotation rate, a 5-degree horizontal beamwidth, and 1-degree vertical beamwidth, the following relationships are obtained. As the antenna rotates, the beam is on a given target in azimuth for 208 milliseconds (bearing gate). During this time a complete elevation scan is made every 100 milliseconds, but the target is in the beam vertically for only one-tenth of this period, or 10 milliseconds (elevation gate). It is apparent, therefore, that either two or three pulse trains each of approximately ten milliseconds duration would be generated as the antenna rotates past the target. This is illustrated in Fig. 3 in which, for example, the 100 microsecond spacing between two of three elevation gates shown leaves only eight pulses in the third elevation gate, the total time in which the elevation gates may appear being only 208 microseconds.

These timing relationships are simulated in the target height generator 22 by generating echo pulses, bearing gates, and elevation gates. Two units are required in order to do this. The first of these, the slant range unit 23, generates light pulses and bearing gates exactly as done by the P.P.I. problem generator 9, range sweep generator 20 serving to drive the sweeps of scope 3 and range height indicator 26 in synchronism in the same manner as generator 12 drives the sweeps of scope 1 and indicator 13, as aforedescribed. The second unit, the elevation unit 24, generates bearing gates and elevation gates. The elevation unit 24 is similar to the P.P.I. problem generator 9 in operation except that:

(1) The A-trace 10 on the oscilloscope 11 (scope 2) represents the height system's elevation scan. This sweep is triggered at the elevation scan rate by electrical connection, as shown, of the elevation sawtooth generator 37 with scope 2 and is of a duration equal to the vertical scan period. It is synchronized with the sweep used on the range height indicator 26 (R.H.I.) for display, indicator 26 also being electrically connected to generator 37 for this purpose.

(2) The ratio of hole-width 17 to tape-width 18 is made equal to the ratio of vertical beam width to vertical scan. Thus as the A-trace 10 sweeps the tape 14 of transport 16 of unit 24, pulses of light of approximately one-tenth the elevation scan period are generated. These pulses can occur, however, only during a bearing gate. The holes in the respective tapes 14 of slant range unit 23 and elevation unit 24 are of the same length and have the same spacing on their respective tapes which are driven in synchronism by the ganged motors 36, so that the holes in the tapes of both units are always open at the same time. The pulses of light from both units appearing during the open bearing gate are converted to electrical pulses in photomultipliers 19 and are amplified. In a coincidence circuit 27 which will be described subsequently the elevation pulses are used in effect to turn the echo pulses on and off. Thus output echo pulses are available only when elevation gates are coincident with bearing gates. The horizontal and elevation scanning of the antenna beam are in fixed relation and this condition is simulated in the range height indicator 26. Since the target position is not fixed but is fortuitous relative to the beam, the target may come into the beam vertically at different times after coming into the beam horizontally. Accordingly, the time relationship of the bearing and elevation gates is not fixed. This is responsible for the fact illustrated in Fig. 3 that the numbers of pulse trains per target presentation may be either two or three (for the given parameters).

*Operation*

(1) The P.P.I. range sweep generator 12, triggered from the trigger pulse generator 28, produces a sweep which is applied to the horizontal amplifier of scope No. 1. The gain of this amplifier is adjusted so that the expanded A-sweep 10 on the C.R.T. 11 is equal to the usable width of the paper tape 14. Distance along the A-sweep represents time from the initiating trigger. The lateral position 18' of a hole in the tape, therefore, also represents time from the initiating trigger. This, in turn, represents range as displayed by the sweep on the indicator 13.

(2) The synchronous motor driver 29 is gear-linked to antenna synchro generator 31, a tape transport mechanism 16, and optionally to any well known sector gating programmer 32. The synchro 31 driven at 4 r.p.m. provides antenna bearing information to a synchro motor (not shown) in the indicator 13. Any well known synchro phase shifter 33 is included in the synchro circuit to permit phase adjustment between the problem generator 9 and the indicator 13 in a well known manner. The 6-inch paper tape 14 is driven vertically past the photomultiplier 19 at the rate of 1.2 inches per second, or 18 inches for each antenna rotation. The spacing of the holes along the tape therefore determines target bearing.

(3) Sector gating may be accomplished by the sector gating programmer 32 which may apply a periodic D.-C. or square wave voltage to the vertical deflection plates of the oscilloscope 11. This causes a vertical displacement of the sweep 10, preventing it from activating the photomultiplier 19. Thus, no video is produced when a hole passes in front of the photomultiplier while the sweep is displaced. When the voltage is removed, the sweep returns to its normal position, allowing light to pass to the photomultiplier each time a hole appears.

(4) The photomultiplier 19 converts the light pulses into electrical pulses which can be amplified and applied to the display C.R.T. as video. However, the decay characteristic of the phosphor screen causes some stretching of the pulse beyond the length desired. For this reason the pulses are differentiated as well as amplified by pulse shaper 34 so as to make them shorter and sharper. This is accomplished by any suitable circuitry well known in the art.

The target-height generator 22 functions in a manner somewhat similar to the P.P.I. target generator 9 but it is more complex, requiring two tapes 14 and transport mechanisms 16. One of these units (slant range unit 23) is similar to the P.P.I. target generator in that a tape punched with holes encoding range and bearing is passed between a fast A-trace (representing range sweep) from scope 3 and a photomultiplier 19. In the second unit (elevation unit 24) a tape with holes encoded as elevation angle and bearing is passed between a slow A-trace (representing elevation sweep) from scope 2 and the photomultiplier 19.

The two synchronous drive motors 36 and tape transport mechanisms 16 are coupled together so as to operate in tandem. They advance both paper tapes at 1.2 inches per second and turn the gear-linked antenna synchro 31 and sector gating programmer 32 at 4 r.p.m. As with the P.P.I. unit 9, each time a hole appears in the aperture between the A-trace 10 and the photomultiplier 19, a pulse output will be generated, amplified and shaped by pulse shapers 34. However, in order to simulate the action of a height-finding type of radar it is necessary to restrict the output video pulses to the times when the "height antenna" 31 is on target both in range and elevation. This is done by combining the outputs of both slant range unit 23 and elevation unit 24; in a coincidence circuit 27, which passes range pulses to the range height indicator 26 from pulse shaper 34 of slant range unit 23 only when they are coincident with the elevation output pulses from pulse shaper 34 of elevation unit 24. The coincidence gate 27 may be of any well known type suitable for the purpose such, for example, as a pentode tube in which the range and elevation output pulses are applied respectively to the suppressor and grid of the tube and the output is taken from the plate of the tube.

Several techniques may be used to vary problems which have been punched on tape. Among these are:

(1) A neutral density wedge may be inserted in the aperture, causing target intensity to attenuate with range. Range of detection may be varied by a lateral shifting of the wedge. In order to utilize this technique some circuit modification of the pulse amplifier would be required, since it presently generates a "standard pulse" regardless of signal input. However, this is within the ability of one skilled in the art and therefore need not be described further.

(2) A-scope sweep intensity may be programmed so as to vary target-intensity levels in discrete steps. (Minor circuit modification would be required, as mentioned above.)

(3) Targets may be blanked out by use of the sector gate programmers.

(4) The range of all targets may be shifted by a fixed amount by a lateral repositioning of the A-trace.

(5) The bearing of all targets may be shifted by a fixed amount by rotation of the differential generators.

Figure 5:
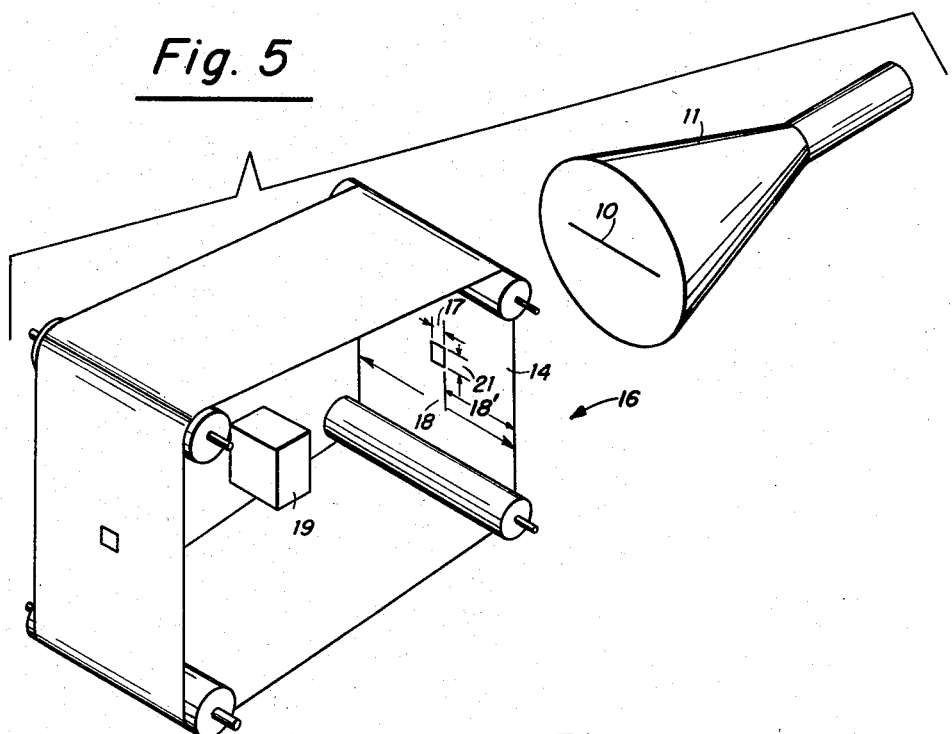
Fig. 5 is a simplified diagram of the single tape loop arrangement.

It is possible to generate long problems involving many targets on a short tape loop on which a single target is punched. By varying the ratio of the total loop length to the length equivalent to 360° antenna rotation, both the problem time and number of targets may be varied over wide limits. The numerator of this ratio when reduced to lowest terms gives the number of antenna rotations before the problem repeats; the denominator gives the number of target tracks. For example, in the case of the single loop tape disclosed in Fig. 5, a single target track punched on a loop 54" long gives a ratio of 54/18 or $$\frac{3}{1}$$

(where 18" equals 360° antenna rotation). This gives three antenna rotations and one target track. A loop 56" long gives a ratio of 56/18 or $$\frac{28}{9}$$

This gives 9 target tracks and 28 antenna rotations before the problem repeats.

Figure 6:
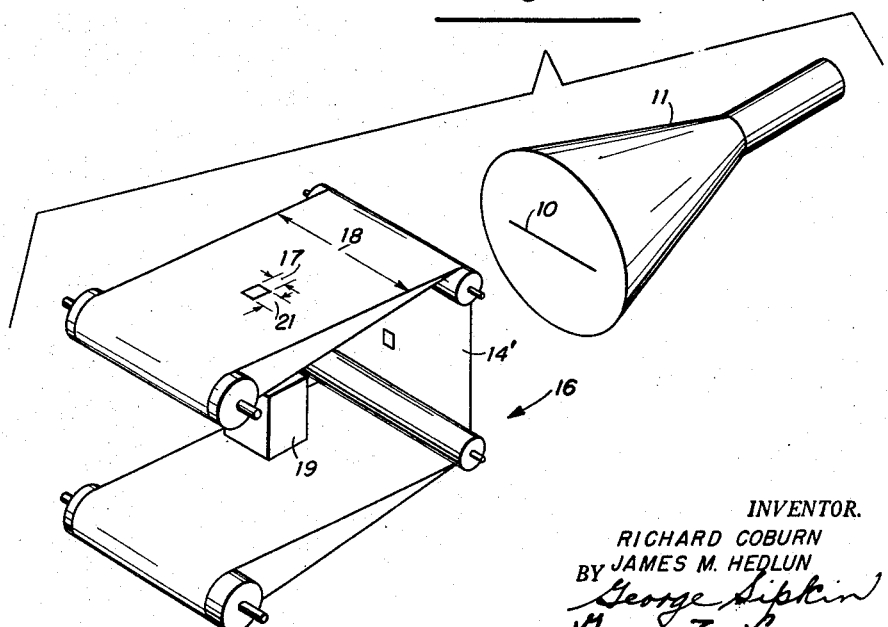
Fig. 6 is a simplified diagram of the double tape loop arrangement.

A tape 14' may be doubled back to form a double loop as shown in Fig. 6 in which case the tape must be punched so that the double layers of the tape parallel to the face of oscilloscope 11 have coinciding openings for passing light from the A-sweep 10. Targets generated by such a tape 14' when employed with the tape transport 16 of problem generator 9 are displayed on plan position indicator 13 in the manner shown in the lower display of Fig. 7. Two tapes 14' used respectively with the tape transports 16 of slant range unit 23 and elevation unit 24 of the target height generator 22 produce a display on range height indicator 26 as appears in the upper display of Fig. 7. The two plan and height displays of Fig. 7 together provide range, bearing, and height information of the single target displayed, which is a cumulative record of one target for an entire run corresponding, for example, to seventeen antenna rotations. Assuming a tape 14' in which the physical length is 25.5 inches, as determined by the fixed length of the loop path, the length of the problem is determined by the ratio of total loop length (25.5 inches) to physical length on the tape of 360° of antenna rotation (in this example 15.0 inches). Again, the numerator of this ratio when reduced to lowest terms gives the number of antenna rotations before the problem repeats (17 rotations lasting 4½ minutes), and the denominator gives the number of target tracks (10). The cumulative track of these 10 targets as it appears on the P.P.I. 13 is shown in Fig. 8.

The versatility and usefulness of the "flying spot" 3-coordinate simulator might be increased by certain additional equipment and variations in operation, as discussed briefly below.

Controllable target generator

The simulator, together with additional associated equipment, might be used in the generation of a controllable target. For this application a book-type scan would be used on the C.R.T. in lieu of the A-scope trace. The book-type scan for the P.P.I. target generator would consist of a fast horizontal sweep for range and a slow vertical sweep for bearing. This target generator would then function as follows. The sweep origin (zero range and bearing) would represent own ship position; a fixed hole in a mask over the scope would represent target plan position. Each time the sweep passed under the hole, pulses would be generated and converted to target video as described above. Target movement would be generated by means of a conning unit with outputs in range and bearing. These outputs would be applied with inverse polarity to the book-type scan so as to shift the origin appropriately with respect to the target hole.

The height target generator in this application would perform as follows: The book-type scan of the slant range unit would be identical with that of the P.P.I. target generator. The elevation unit would have a book-type scan with elevation angle on the horizontal, and bearing on the vertical, dimension. The slant range unit would be driven in range and bearing by the conning unit as described above. The elevation unit would also be driven by the conning unit, but its inputs would be bearing and elevation angle (both with inverse polarity). The coincidence circuits and video amplifiers would operate as for the programmed target application.

Programmed and controllable targets from separate generators could be mixed in a common video circuit. By use of time-sharing techniques and physical sharing of right and left halves of the C.R.T., programmed and controllable target generation might be combined in one scope.

Automatic tape puncher

An automatic tape puncher could be designed for utilization with this equipment in generation of a controllable target or simply in the preparation of long tapes. In the first application the tape punch mechanism would be mounted as close as possible to the photo multiplier so as to have a minimum of delay between the time of encoding and the time of playback. (This could be of the order of just a few seconds.) In the second application, position of the tape punch would be immaterial.

The punch head of the P.P.I. target generator unit would be mounted on a lathe-type screw which would be driven by the range output of the conning unit. The punch-activating solenoid would be energized from a coincidence circuit with two inputs: bearing, from the conning unit, and antenna position from the simulator transport mechanism. Each time the two inputs coincided in phase, the punch solenoid would be activated. The paper would be pulled through at constant speed (or possibly step by step) by the transport mechanism. Thus the tape would be punched with target range plotted transversely and bearing plotted longitudinally.

The slant range punch of the height target generator and that of the P.P.I. target generator would be identical except in size. The elevation unit would be similar in principle except that the lathe-type screw would be driven with elevation angle information.

Land mass generator

A fixed land mass could be simulated by substituting rotating disks for the paper tape normally used with the P.P.I. target generator. Land mass radar signals would be encoded as transparent portions of the disk. The disk would be driven at the antenna rotation rate. The video signals from such a generator could be mixed with target video from other generators for feeding the display indicator.

An alternative method of land mass generation would utilize a P.P.I. target generator as described above, except that: (1) the loop would be a whole-number multiple of 360° in length; and (2) the holes would be of appropriate size and shape to give the desired land-mass signal.

Obviously many modifications and variations of the present invention are possible in the light of the above teachings. It is therefore to be understood that within the scope of the appended claims the invention may be practiced otherwise than as specifically described.

What is claimed is:

1. A multiple radar target simulator for duplicating the timing relationships in actual radar systems for presentation of simulated targets, which comprises a video indicator, a sweep generator, a trigger pulse generator for generating echo pulses and connected to said sweep generator to deliver said pulses thereto, an oscilloscope connected to said sweep generator to receive therefrom said simulated echo pulses and provide a straight line sweep corresponding with the pulse repetition rate of said sweep generator, a motor, means operated by the motor for passing a tape of opaque material continuously and progressively in front of said oscilloscope in a position in which said line sweep will impinge thereon in a direction approximately normal to its face and at a speed representing simulated antenna rotation, said tape having a plurality of individual apertures spaced apart in positions to pass in front of said straight line sweep of said oscilloscope, said apertures being located in positions crosswise of and longitudinally of said tape that correspond to assumed objects to be detected on said position indicator, light sensitive means disposed in front of and aligned with said straight line sweep, with said tape passing between said light sensitive means and said oscilloscope, pulse shaper means connected to said light sensitive means and to said indicator to receive from said light sensitive means, signal pulses generated in the latter by light from said straight line sweep that passes through any of said apertures aligned therewith and to transmit shaped pulses to said indicator.

2. A multiple radar target simulator as in claim 1, wherein said apertures of said tape are spaced from the edge thereof at such distance that pulses of light through said holes resulting from the straight line sweep represent target range, said holes having such width that the ratio of hole-width to tape-width represents the ratio of pulse duration to repetition period.

3. A multiple radar target simulator as in claim 1, the length of said holes measured parallel to the edges of said tape and to the direction of movement of said tape corresponding to the desired horizontal beam width of said search antenna thereby permitting light pulses to pass through said tape to said light sensitive element when said simulated antenna faces the desired bearing of said simulated target.

4. A radar target simulator which comprises a cathode ray tube, means for mounting an opaque tape for movement progressively in front of said tube, an antenna synchro generator, a motor connected to said generator and said tape mounting means to operate them, a photomultiplier disposed in front of said cathode ray tube with a space between them through which said tape is fed progressively by said mounting means, a sector gate programmer connected to said antenna synchro generator and to said tube, a position indicator, and a pulse shaper and differentiator connected to said photomultiplier and to said position indicator, whereby when said tape with apertures therein is passed between said cathode ray tube and said photomultiplier, the apertures will pass light pulses from said tube to said photomultiplier and cause formations to appear on said indicator corresponding to the positions of said apertures on said tape and their size.

5. The simulator as set forth in claim 4, and a phase shifter connected directly between said antenna synchro generator and said position indicator.

6. The simulator as set forth in claim 4, and a sweep generator connected to said tube and also to said position indicator, and a pulse generator connected to said sweep generator.

7. A radar target simulator which comprises a pair of cathode ray tubes, a pair of light sensitive elements disposed one in front of and spaced from each tube, an antenna synchro generator, means for mounting a pair of individual opaque tapes for movement progressively and linearly one between each tube and its related light sensitive element, motor means connected to and operating said tape mounting means and said antenna synchro generator concomitantly, a position indicator, a pulse shaper connected to each light sensitive element, a coincidence gate connected to each of said pulse shapers and to said position indicator, a sector gate programmer connected between said antenna synchro generator and one of said tubes, a phase shifter connected between said antenna synchro generator and said position indicator, a trigger pulse generator, a range sweep genertor connected to said pulse generator, to the other of said tubes, and also directly to said position indicator, and an elevation saw-tooth generator connected to said one tube and also directly to said position indicator for providing the vertical sweep voltage to the indicator for elevation angle and to the horizontal amplifier of said one tube, whereby when opaque tapes having selectively placed apertures therein are passed progressively in front of said tubes by said mounting means, the apertures in said tapes will pass light pulses between said tubes and light sensitive means and cause formations to appear on said indicator corresponding to the positions of said apertures on said tape and their size.

8. A radar target simulator which comprises an indicator, a pair of cathode ray tubes, a pair of light sensitive elements disposed one in front of and spaced from each tube, an antenna synchro generator, a pair of apertured opaque tapes, means mounting each tape for linear movement across the space between one of said tubes and its related light sensitive element, one tape for each tube, each of said tapes having its apertures arranged therein according to a selected pattern to pass in succession and in different positions in front of a related said tube, the apertures in one tape by their position on the tape and size representing range and bearing, and the apertures in the other tape by their position on the tape and size representing elevation angle and bearing, said apertures when in front of its related tube passing light pulses from the related tube to the related light sensitive element, a coincidence circuit, means for delivering signals created by the passed light pulses in both light sensitive elements to said coincidence circuit, and means connecting said coincidence circuit to said indicator.

9. A radar target simulator which comprises a pair of light sensitive elements, a video indicator, means for delivering to one of said elements a selected pattern of light pulses representing range and bearing of an assumed target, means for delivering to the other of said elements a selected pattern of light pulses representing elevation angle and bearing of said assumed target, means for shaping and differentiating the signals generated in each of said light sensitive elements, means including a coincidence circuit for combining the signals from said shaping and differentiating means and passing them to said indicator when both signals reaching the coincidence circuit are coincident.

10. A radar target simulator which comprises a video indicator, an antenna synchro generator, a cathode ray tube, a tape transport mechanism for passing an apertured opaque tape linearly and progressively across the face of said tube, the apertures in said tape representing assumed targets, a light sensitive element aligned with the face of said tube but with the tape passing between it and the tube, said generator being connected to said indicator and having a phase adjustor in series therein, means including a sweep generator for creating a straight line sweep in said tube in a direction crosswise of the direction of travel of the tape across the face of said tube, and equal to the usable width of said tape, means for triggering said sweep, means for shaping and differentiating the electric pulses created in the light sensitive element by light pulses from said tube through said tape apertures that impinge on said light sensitive element and delivering them to said indicator, means for sector gating the sweep of said tube in accordance with the rotation of said antenna synchro generator, and means for rotating said tape and antenna synchro generator at selected relative rates.

11. The simulator as set forth in claim 10 wherein said sweep generator also delivers a sweep to said indicator.

References Cited in the file of this patent

UNITED STATES PATENTS

| | | |
|---|---|---|
| 2,102,139 | Vance | Dec. 14, 1937 |
| 2,168,049 | Skellett | Aug. 1, 1939 |
| 2,652,636 | Gorman et al. | Sept. 22, 1953 |
| 2,720,039 | Brown | Oct. 11, 1955 |
| 2,737,730 | Spencer | Mar. 13, 1956 |
| 2,740,205 | Shamis et al. | Apr. 3, 1956 |
| 2,811,789 | Paine | Nov. 5, 1957 |